United States Patent
Vick et al.

(10) Patent No.: US 9,378,199 B2
(45) Date of Patent: *Jun. 28, 2016

(54) CONCURRENT PARSING AND PROCESSING OF SERIAL LANGUAGES

(75) Inventors: Christopher A. Vick, Santa Clara, CA (US); Bin Wang, Santa Clara, CA (US); Mehrdad Mohammad H. Reshadi, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

This patent is subject to a terminal disclaimer.

(21) Appl. No.: 13/589,862

(22) Filed: Aug. 20, 2012

(65) Prior Publication Data

US 2012/0317475 A1 Dec. 13, 2012

Related U.S. Application Data

(63) Continuation of application No. 13/106,064, filed on May 12, 2011, now Pat. No. 8,413,047.

(51) Int. Cl.
G06F 17/22 (2006.01)
G06F 17/27 (2006.01)

(52) U.S. Cl.
CPC .......... *G06F 17/272* (2013.01); *G06F 17/2247* (2013.01)

(58) Field of Classification Search
USPC .................... 715/234, 237; 717/115, 119, 139
See application file for complete search history.

(56) References Cited

U.S. PATENT DOCUMENTS

| | | | |
|---|---|---|---|
| 6,560,616 B1 | 5/2003 | Garber | |
| 6,951,014 B1 | 9/2005 | Sokolov | |
| 6,973,492 B2 | 12/2005 | Streble | |
| 7,281,203 B2 | 10/2007 | Gessner | |
| 7,694,008 B2 | 4/2010 | Chang et al. | |
| 8,413,047 B2 | 4/2013 | Vick et al. | |
| 2005/0229048 A1 | 10/2005 | Da Palma et al. | |
| 2006/0277459 A1 | 12/2006 | Lemoine | |
| 2008/0155397 A1 | 6/2008 | Bissonnette et al. | |
| 2008/0222242 A1 | 9/2008 | Weiss et al. | |
| 2009/0106769 A1 | 4/2009 | Nakamura | |
| 2010/0153692 A1 | 6/2010 | Kota et al. | |
| 2012/0110433 A1 | 5/2012 | Pan et al. | |
| 2013/0047077 A1 | 2/2013 | Vick et al. | |

OTHER PUBLICATIONS

Matt Frear; Generating and injecting HTML content with Javascript and jQuery; Mar. 24, 2010; Matt's work blog; pp. 1-7.*

(Continued)

*Primary Examiner* — Andrew Dyer

(57) ABSTRACT

The aspects enable a processor to concurrently execute a first serial language code (e.g., HTML) embedding a second serial language code (e.g., JAVASCRIPT®) during a page load operation by a browser. A parser parses the first serial language code until a segment of the embedded second serial language code is encountered. The segment of embedded second serial language code is extracted for execution by an execution engine, which proceeds concurrently with speculative parsing of the first serial language code. Code generated by execution of second serial language code is evaluated to determine if it is well formed, and a partial rollback and re-parsing of the first serial language code is performed if the code is not well formed.

21 Claims, 8 Drawing Sheets

(56) References Cited

OTHER PUBLICATIONS

Meyerovich, L., et al., "Fast and Parallel Webpage Layout," International World Wide Web Conference Committee (IW3C2), Apr. 26-30, 2010, Raleigh, NC, 10pgs.

Gonina E et al., "Task Queue Implementation Pattern", Internet citation, Feb. 17, 2010 (Feb. 17, 2010), pp. 1-11, XP002679154, Retrieved from the Internet:URL:http://web.archive.org/web/20100217024926/http://pariab.eecs.berkeley.edu/wiki/_media/patterns/taskqueue.pdf [retrieved on Jul. 3, 2012] p. 1, paragraph 1-3.

James E. Smith; A Study of Branch Prediction Strategies; 1981; IEEE; pp. 135-148.

Sivonen H, "HTML5 Parser", Internet Citation, Mar. 21, 2011 (2011-03-21), pp. 1-4, XP002679162, Retrieved from the Internet:URL:https://developermozilla.org/en/Html/HTML5/HTML5_Parser [retrieved on Jul. 3, 2012] p. 3, line 38-p. 4, line 14.

Sivonen H, "Speculative HTML Tree Building", Internet Citation, Mar. 11, 2009, pp. 1-3, XP002679153, Retrieved from the Internet: URL:http://groups.google.com/group/mozilla.dev.piatform/msg/5f0e803711e04aef?dmode=source[retrieved on Jul. 3, 2012].

Badea C et al., "Towards Parallelizing the Layout Engine of Firefox", 2nd USENIX Workshop on Hot Topics in Parallelism Internet citation, Jun. 14, 2010, XP002679163, Retrieved from the Internet: URL:http://static.usenix.org/event/hotpar10/tech/full papers/Badea.pdf [retrieved on Jul. 3, 2012], pp. 1-6.

International Search Report and Written Opinion—PCT/US2012/037722—ISA/EPO—Jul. 19, 2012, 14pgs.

"Parallelizing the Web Browser: Browsing Web 3.0 on 3 Watts," L. Meyerovich, et al., ParLab UC Berkeley, Mozilla, published 2009, 33pgs.

\* cited by examiner

CONCURRENT PARSING AND PROCESSING OF SERIAL LANGUAGES

RELATED APPLICATIONS

This application is a continuation of U.S. patent application Ser. No. 13/106,064 entitled "Concurrent Parsing and Processing of HTML and JAVASCRIPT®" filed on May 12, 2011 now U.S. Pat. No. 8,413,047, the entire contents of which are hereby incorporated by reference for all purposes.

FIELD

The present invention relates to methods, systems, and devices for rendering HTML documents in a web browser, and more particularly to methods for concurrent parsing of HTML and processing of JAVASCRIPT® implemented in a mobile device processor.

BACKGROUND

Dynamic scripting languages are a preferred development platform in computer programming and software development. In particular, JAVASCRIPT®, which may be embedded in Hyper-Text Markup Language (HTML), is a popular development language for web pages and web applications. Dynamic scripting languages are designed for interactive execution (scripting), and typically execute via interpretation, in which, at runtime, the scripts are parsed and analyzed before they are executed. As more and more features are demanded by users of web pages and web applications, the complexity and quantity of dynamic scripting languages embedded in HTML continues to increase. As a result, an increasing amount of time is spent by computing devices parsing, interpreting, analyzing, and executing scripts embedded in webpages, resulting in slower webpage load times and degrading the user experience.

SUMMARY

The various aspects disclosed herein provide methods for concurrently executing an HTML parser and a JAVASCRIPT® execution engine during a page load operation in a browser. Most web pages contain JAVASCRIPT® code embedded within HTML code. Most browsers process the HTML code and the JAVASCRIPT® code sequentially (e.g., serially), as they are encountered during the parsing of the HTML code. Specifically, in current browsers, an HTML parser runs until it encounters a script tag, at which point it suspends its operations while a JAVASCRIPT® execution engine executes the contents of the script associated with that tag (i.e. on the script text). When the JAVASCRIPT® engine finishes executing the script text, it returns control back to the HTML parser, which restarts parsing the HTML code. This process is specified by standards and ensures that HTML code generated by execution of JAVASCRIPT® text is parsed in the proper order. However, this serial execution of the HTML and JAVASCRIPT® processes significantly slows down the process of loading and displaying a webpage.

The various aspects provide mechanisms for parallel processing of the parsing operations of the HTML code and the execution operations of JAVASCRIPT® code, with a provision for a partial rollback and re-parsing of HTML in the event there is a violation of the HTML, DOM, and/or JAVASCRIPT® semantics. The various aspects allow the HTML parser and the JAVASCRIPT® engine to execute concurrently. Concurrent execution speeds page loading in a browser by not stalling the parsing of the HTML code while the JAVASCRIPT® scripts are fetched, loaded, parsed, and executed.

In executing the markup language code in a processor, the various aspects provide for receiving a request to load a web page as well as markup language code (including embedded scripting language code) associated with the requested web page. The received markup language code may be parsed to generate parse data. The parsing may continue until a segment of the embedded scripting language code is encountered. Upon encountering a segment of the embedded scripting language code, the various aspects provide for packaging the scripting language code and parsing state information into an execution state package. In various aspects, the execution state package may be stored in a scripting language script queue and the parsing the received markup language code may be resumed.

The various aspects provide for obtaining the segment of scripting language code from the scripting language script queue, executing the obtained segment of scripting language code concurrent with continued parsing of the markup language code, and determining whether markup language code generated from execution of the obtained segment of scripting language code is well formed. In various aspects, when it is determined that the generated markup language code is well formed, the generated markup language code may be stored in a memory. In various aspects, when it is determined that the generated markup language is not well formed, the parsing state stored in the execution state package may be retrieved, the parse data resulting from parsing of the markup language code after a point in the markup language code identified by the retrieved execution state package may be discarded, and the parsing of the markup language code may be re-initiating from the point in the markup language code identified by the retrieved execution state package.

In various aspects, the packaging of the recognized scripting language code and state information in an execution state package may include extracting the segment of scripting language code contained in the identified portion of the markup language code, storing a memory location associated with the extracted portion of the scripting language code, storing an execution context associated with the extracted portion of the scripting language code, and bundling the stored memory location and stored execution context with the extracted portion of the scripting language code in the execution state package. In various aspects, the storing the execution state package in a scripting language script queue may include storing the execution state package in a rear terminal position of the scripting language script queue. In various aspects, obtaining the segment of scripting language from the scripting language script queue may be initiated in response to an execution state package being stored in the scripting language script queue. In various aspects, obtaining a segment of scripting language from the scripting language script queue may include extracting the segment of scripting language code from the execution state package stored in a front terminal of the scripting language script queue.

In various aspects, an obtained segment of scripting language may be executed independent of the concurrently executing parsing process. In various aspects, the execution process may include monitoring the scripting language script queue to determine if the scripting language script queue contains scripts available for processing. The various aspects provide for retrieving execution state packages from a front terminal of the scripting language script queue when it is determined that the scripting language script queue contains scripts for processing, extracting scripting language code from the retrieved execution state package, evaluating the extracted scripting language code to identify specific characteristics that allow the scripting language execution process to insert a second unit of markup language code into the received markup language code associated with the requested web page, and executing the extracted scripting language code using identified specific characteristics to generate a second unit of markup language code.

The various aspects provide for repeating the execution of one or more of the above mentioned operations until all markup language code has been parsed and all scripting language code has been executed. For example, in an aspect, the operations of: parsing the received markup language code, packaging encountered scripting language code into execution packages, storing the execution packages in the scripting language script queue, continuing parsing the received markup language code, obtaining the segment of scripting language code from the scripting language script queue, and executing the obtained segment of scripting language code concurrent with continued parsing of the markup language code may be repeated until all markup language code has been parsed and all scripting language code has been executed.

In various aspects, the storing the generated markup language may include inserting the generated markup language code into markup language code associated with the requested web page. In various aspects, the system may determine whether the parsing of the markup language code is complete and/or whether the execution of all the scripting language code is complete and render the requested web page based upon determining that parsing of the markup language code and/or execution of all scripting language code has completed. In various aspects, the process of determining whether the markup language code generated from execution of the obtained segment of scripting language is well formed may include parsing the generated markup language code with a well formed parser. In various aspects, the markup language parser may be notified when it is determined that the generated markup language code is not well formed.

Some aspects include computing devices with means for accomplishing the operations of the foregoing methods. Further aspects include a computing device including memory and a processor coupled to the memory and configured with process-executable instructions to perform the operations of the foregoing methods. Further aspects include non-transitory computer readable storage medium having stored thereon processor-executable instructions configured to cause a computing device processor to perform the operations of the foregoing methods.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
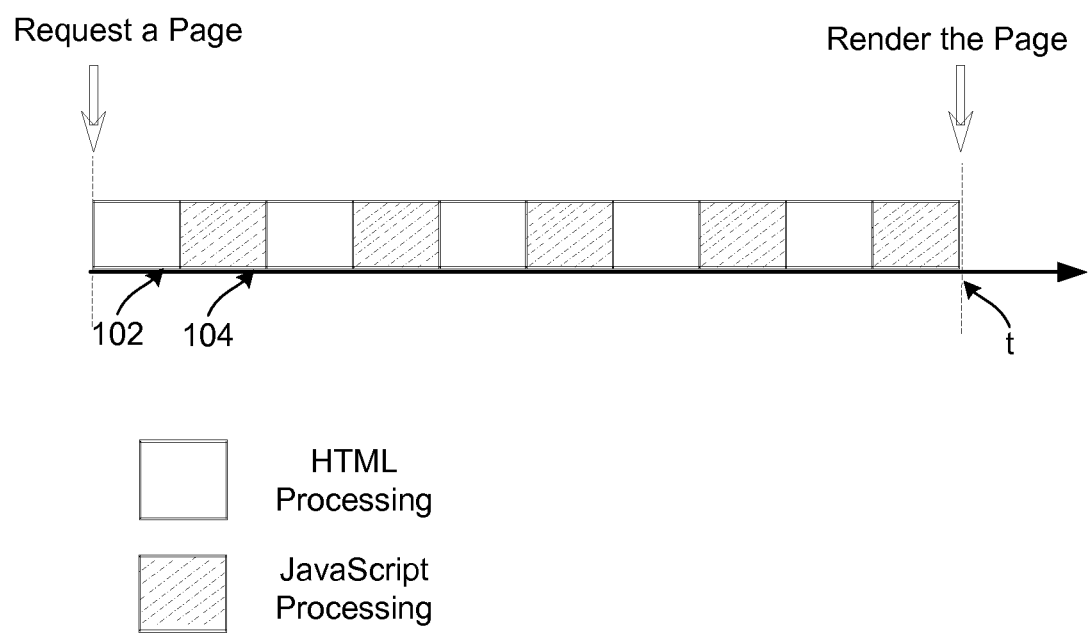
FIG. 1 is a timing diagram that illustrates a method for controlling the interaction between HTML processing and JAVASCRIPT® processing during a page load operation in a browser.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "electronic device," "mobile device" and "computing device" are used interchangeably herein to refer to any one or all of personal computers, cellular telephones, personal data assistants (PDA's), palm-top computers, wireless electronic mail receivers (e.g., the BLACKBERRY® and TREO® devices), multimedia Internet enabled cellular telephones, and similar personal electronic devices which include a programmable processor. While the various aspects are particularly useful in mobile devices, such as cellular telephones, which may have limited processing power, the aspects are generally useful in any computing device that executes scripts and/or applications written in dynamic, scripting and/or markup languages.

The terms "dynamic language" and "scripting language" are used generically and interchangeably in this application to refer to any dynamic language, scripting language, or to any interpreted language used to write programs (herein as "scripts") that are interpreted and/or compiled at runtime. These terms may also refer to any language that runs on a managed runtime and is dynamically compiled. Thus, for the purposes of this application, the terms "dynamic language" and "scripting language" should not be limited to languages that are interpreted from source code or bytecode, or to those that execute along with programs that are traditionally compiled into native machine code. Examples of dynamic and scripting languages within the scope of this application include, for example, JAVASCRIPT®, PERL, PYTHON, and RUBY, as well as JAVA and other languages that may be developed in the future.

The term "markup language" is used generically in this application to refer to any programming language and/or system for annotating text such that a processor may syntactically distinguish the annotations from the text. Examples of markup languages include Scribe, Standard Generalized Markup Language (SGML), Hyper-Text Markup Language (HTML), Extensible Markup Language (XML), and Extensible Hyper-Text Markup Language (XHTML).

The term "queue" is used generically in this application to refer to a linear data structure containing an ordered collection of objects. The principal operations on the queue are the addition of entities to the rear terminal position and removal of entities from the front terminal position. Queues are generally First-In-First-Out (FIFO) data structures, in which the first element added to the queue will be the first one to be removed. Queues, as used herein, may be implemented using circular buffers, linked lists, and/or pointer arrays. A linked list is a data structure that includes a sequence of objects containing a reference link to the next record in the sequence. Linked lists allow objects to be inserted and/or removed at any position in the list by modifying the reference links of one or more individual objects. Thus, the order of the linked items may be different from the order that the data items are stored in memory or on disk.

For ease of reference, throughout this application, HTML is used as an exemplary markup language and JAVASCRIPT® is used as an exemplary dynamic scripting language. However, it should be noted that the use of HTML and JAVASCRIPT® in this application is only exemplary, and should not be used to limit the scope of this application to just HTML and/or JAVASCRIPT®, unless expressly recited by the claims.

HTML is a markup language that implements the ISO/IEC 15445 standard. HTML may be characterized as a set of markup tags (e.g., annotations) used to describe web pages such that they can be displayed by a software application, such as a web browser. HTML allows for the creation of structured documents by denoting structural semantics for text, such as headings, paragraphs, lists, links, quotes, and other items.

JAVASCRIPT® is a dynamic, weakly typed, object-oriented scripting language that implements the ECMAScript language standard (standardized by ECMA International in the ECMA-262 specification) and/or the ISO/IEC 16262 standard. JAVASCRIPT® enables programmatic access to computational objects within a host environment, such as web browsers executing on a mobile device processor.

HTML can embed JAVASCRIPT® code capable of affecting the behavior and/or presentation of the containing HTML page. The embedded JAVASCRIPT® code may also generate additional HTML code, which can be inserted into the containing HTML page (the HTML code in which the JAVASCRIPT® is embedded). JAVASCRIPT® may be used to embed functions into HTML code such that the functions interact with, and manipulate, the document object model (DOM) of the HTML page. DOM is a language-independent convention for representing and interacting with objects in HTML, and allows the JAVASCRIPT® code to have access to, and manipulate, the containing HTML page.

JAVASCRIPT® code may be embedded in HTML code, and at the same time, generate additional HTML code to be inserted into the containing HTML page. To enable this, the HTML code (including HTML code generated by execution of JAVASCRIPT® code) current standards require the code to be parsed in sequential (i.e., serial) order so as to avoid repeatedly evaluating and/or processing the same information. To ensure proper order, browsers typically require at least two different mechanisms, or processes, to interpret, parse, and execute the JAVASCRIPT® code and the containing HTML code. For example, to interpret and display an HTML web page having JAVASCRIPT® code embedded therein, web browsers must typically run an HTML parser that separates the HTML markup tags from the substantive content and a JAVASCRIPT® execution engine that parses and executes the embedded scripts. The HTML parser typically runs until it encounters a JAVASCRIPT® tag, at which point it suspends its operations until the JAVASCRIPT® tag is processed. While the HTML parser is suspended, a JAVASCRIPT® engine is evoked to process the contents of the script (i.e. script text) associated with encountered tag. When the JAVASCRIPT® engine finishes executing the script text, it returns control back to the HTML parser, which restarts parsing the HTML code. This process is specified by standards (e.g., ECMAScript, ISO/IEC 16262) and ensures that the HTML code generated by execution of JAVASCRIPT® text is parsed in the proper (i.e., serial) order.

As mentioned above, the HTML parser typically runs until it encounters a JAVASCRIPT® tag, at which point it suspends its operations until the JAVASCRIPT® engine finishes executing the script text associated with the encountered tag. Thus, the HTML parser and the JAVASCRIPT® engine typically execute in a serial manner, in which only one of the two processes execute at any given time. The serial nature of this process significantly slows down the process of loading a webpage.

The various aspects provide methods for concurrently executing an HTML parser and a JAVASCRIPT® engine during a page load operation in a browser. As mentioned above, current browsers execute the HTML parser and the JAVASCRIPT® engine serially (i.e., one and then the other) during the parsing of HTML code. The various aspects provide mechanisms for parallel execution of the processes of parsing of the HTML code and executing the JAVASCRIPT®, with a provision for a partial rollback and re-parsing of HTML in the event there is a violation of the HTML, DOM, and/or JAVASCRIPT® semantics. These mechanisms allow the HTML parser and the JAVASCRIPT® engine to execute concurrently. Concurrent execution speeds up the process of loading and rendering a webpage because the HTML parser does not need to be stalled while the JAVASCRIPT® scripts are fetched, loaded, parsed, and executed.

FIG. 1 is a timeline of convention HTML and JAVASCRIPT® processing during a page load operation in a browser. Specifically, FIG. 1 illustrates that the HTML processing and a JAVASCRIPT® processing are interdependent, and do not execute at the same time in a conventional browser. In the example illustrated in FIG. 1, the process of rendering a webpage may begin by issuing a request to a computing device for a desired page. In response, the computing device may initiate a HTML process 102 to begin executing tasks associated with a page load operation. For example, the HTML process 102 may begin parsing the HTML and Cascading Style Sheets (CSS), issuing any required requests for sub-resources, matching any necessary CSS rules, computing styles, laying out the webpage, and performing other operations required for processing the HTML code. If during the process of execution, the HTML process 102 encounters a JAVASCRIPT® tag (e.g., <script type="text/javascript">) the HTML process 102 stops processing the HTML code, packages up the contents of the script associated with that tag (i.e. the script text), and hands control over to a JAVASCRIPT® processing unit.

The JAVASCRIPT® processing unit initiates a JAVASCRIPT® process 104 to evaluate, parse, and execute the encountered script text. For example, the JAVASCRIPT® process 104 may begin issuing JAVASCRIPT® requests, parsing, and compiling the JAVASCRIPT® code, executing the compiled JAVASCRIPT® code, and/or generating HTML code. Once the JAVASCRIPT® process 104 completes its operations, any HTML code generated during execution of the scripts is inserted back into the original HTML document. The JAVASCRIPT® process 104 then transfers control back to the HTML processing unit, which restarts processing the HTML at the point it previously suspended its operations.

By stalling its operations, the HTML processing unit can ensure that the HTML code generated by the JAVASCRIPT® process 104 is parsed and checked for completeness. For example, by stalling operations, the HTML processing unit can check the generated HTML code to ensure that all the open tags ("<") have a corresponding close tag (">"), and fix any errors. In this manner, the HTML processing unit can naturalize any negative impact that HTML code inserted by execution of the JAVASCRIPT® may have otherwise had on other portions of the HTML code. After all the HTML and embedded JAVASCRIPT®s are processed, the webpage may be rendered on a display of a computing device, such as on an electronic display of a mobile phone.

As illustrated in FIG. 1, the HTML and JAVASCRIPT® processes are interdependent and must execute one after the other in a conventional browser. This serial execution is mandated by specifications set forth by the standards governing JAVASCRIPT® and HTML. Specifically, the standards specify that there is a mutual dependency between the HTML parser and the JAVASCRIPT® engine (i.e., the dependency runs in both directions between JAVASCRIPT® engine and the HTML parser). The specifications mandate this "mutual dependency" so as to avoid any conflicts that may arise between the HTML parser and the JAVASCRIPT® engine. As a result, in most implementations, the JAVASCRIPT® process can only process code that the HTML parser has already processed, and the HTML parser must wait until the JAVASCRIPT® process is complete before resuming execution.

As discussed above, specifications require the HTML and JAVASCRIPT® processes to be interdependent so as to avoid any conflicts that may arise between the HTML parser and the JAVASCRIPT® engine. Conflicts may arise because the JAVASCRIPT® specification allows the JAVASCRIPT® engine to generate new HTML code. This generated HTML code may change the state of the HTML parser and influence how the HTML parser parses the remaining HTML code in the document. For example, the JAVASCRIPT® engine may generate code that is not well-formed (e.g., not all the open tags "<" have a corresponding close tag ">") and insert the not well-formed code into the containing HTML in a manner that could cause the HTML parser to erroneously process the remaining HTML code if not for the serial execution constraint. For example, if the JAVASCRIPT® engine inserts HTML code that is not well-formed while HTML parsing continues, the HTML parser may encounter an open tag (e.g., "<") without a corresponding close tag (e.g., ">") and assume that the next encountered open tag (e.g., "<") is to be nested inside the previous open tag (or alternatively, the HTML parser may erroneously insert a close tag where one was not intended). To avoid these errors, the HTML parser is conventionally implemented to be dependent on the JAVASCRIPT® engine (i.e., must wait for the JAVASCRIPT® engine to finish execution) and the JAVASCRIPT® engine is typically implemented to be dependent on the HTML parser (i.e., JAVASCRIPT® engine must wait for the HTML parser to process and build portions of the code before starting execution).

The various aspects provide methods for processing HTML and JAVASCRIPT® so that there is only a one-way dependency between the HTML parser and the JAVASCRIPT® engine, thereby enabling concurrent parsing and execution of HTML and embedded JAVASCRIPT®. Specifically, the various aspects enable the HTML parser to execute independent of the JAVASCRIPT® engine. As mentioned above, the JAVASCRIPT® engine is dependent on the HTML parser because the HTML parser processes and builds portions of the code required by JAVASCRIPT® engine. However, in accordance with the various aspects, the dependence of the HTML parser on the JAVASCRIPT® engine may be broken, creating a one-way dependency between the HTML parser and the JAVASCRIPT® engine.

Figure 2:
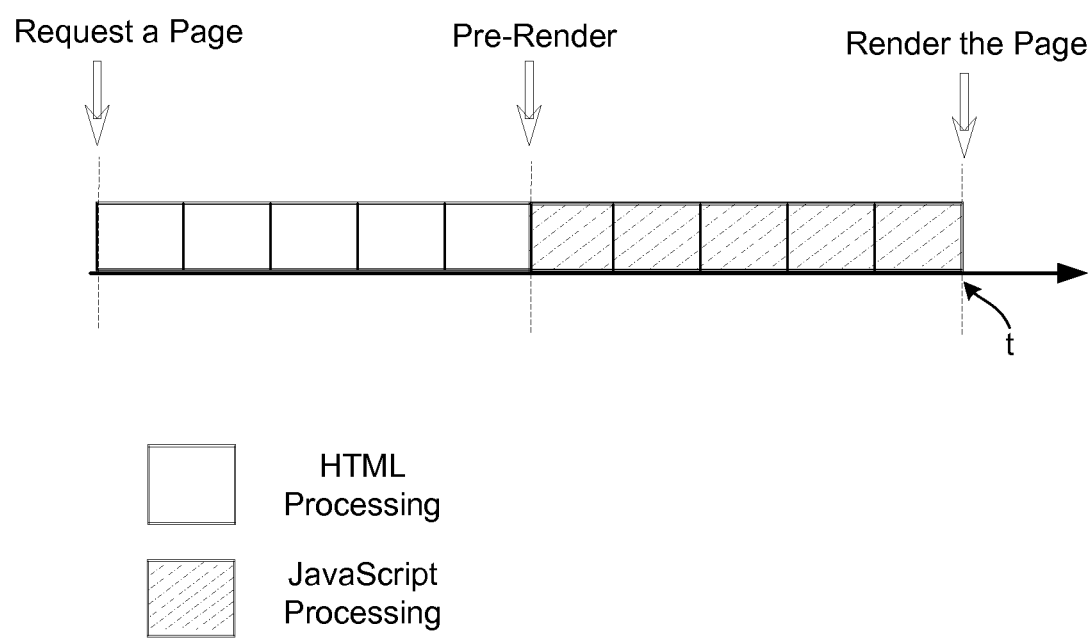
FIG. 2 is a timing diagram that illustrates an alternative method for controlling the interaction between HTML processing and JAVASCRIPT® processing during a page load operation in which there is only a one-way dependency between the HTML parser and the JAVASCRIPT® engine.

FIG. 2 illustrates timing of an alternative method for controlling the interaction between HTML processing and JAVASCRIPT® processing during a page load operation in which there is only a one-way dependency between the HTML parser and the JAVASCRIPT® engine. In the method illustrated in FIG. 2, the HTML processing unit may be configured to process all the HTML code upfront, with the JAVASCRIPT® processing unit being configured to wait until all the HTML has been processed by the HTML processing unit. This method enables portions of the processed HTML code to be pre-rendered in a browser so that a user can begin to view the contents of the page not affected by the embedded JAVASCRIPT® before all the required scripts are actually executed. However, in this alternative configuration the total time required to render the page, in its entirety, is the same as or slower than the method illustrated in FIG. 1. This is because the JAVASCRIPT® engine must still wait until all HTML processing is complete before it can begin execution. Additionally, since the JAVASCRIPT® engine is typically initiated after the HTML processing unit, the JAVASCRIPT® engine may invalidate the HTML processing (e.g., HTML parsing), forcing the system to reparsing of the entire document and re-render the page. Additionally, since this alternative configuration is out-of-order serial parse, the parse is speculative and may have to be re-run after the execution of the JAVASCRIPT® engine. Thus, in this alternative configuration, true speed gains are not realized, the HTML parse is speculative, and the HTML and JAVASCRIPT® processes must still executed serially.

Figure 3:
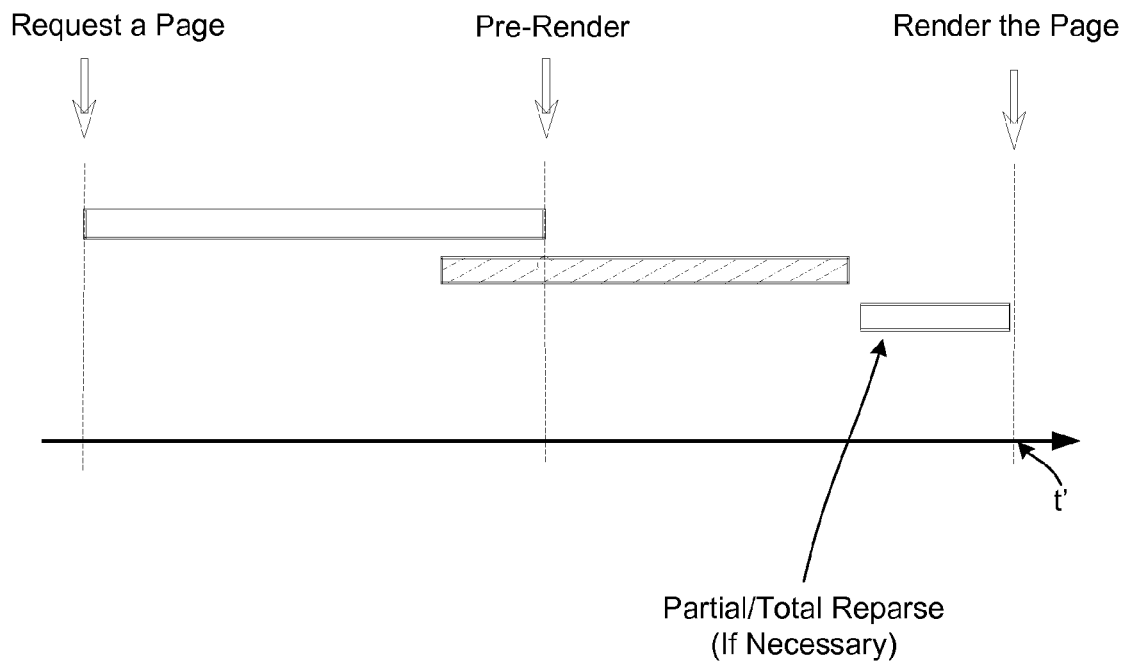
FIG. 3 is a timing diagram that illustrates another alternative method for controlling the interaction between HTML processing and JAVASCRIPT® processing during a page load operation in which there is only a one-way dependency between the HTML parser and the JAVASCRIPT® engine.
Figure 3:
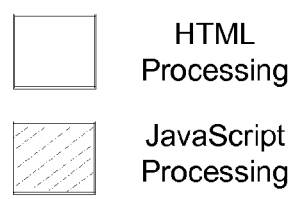

FIG. 3 illustrates timing of execution of HTML and JAVASCRIPT® processing during a page load operation using an aspect method which enables the processes to execute concurrently. In the aspect methods the HTML processing and JAVASCRIPT® processing are executed concurrently, with processing broken up into processing units by the script tags appearing in the HTML code. In the aspect method, the JAVASCRIPT® scripts are only dependent on the partial completion of the HTML process (up to the script tag for the particular script), and the HTML process may continue to speculatively parse the remaining portions of the HTML code while the JAVASCRIPT® scripts execute. In certain situations, after the JAVASCRIPT® scripts finish execution, the HTML code may have to be partially or totally reparsed based on the results of the JAVASCRIPT® execution. In any case, the total time required to render the entire page is significantly reduced. These time savings are illustrated in FIG. 4, which contrasts the processing times associated with the three methods illustrated in FIGS. 1-3.

Figure 4:
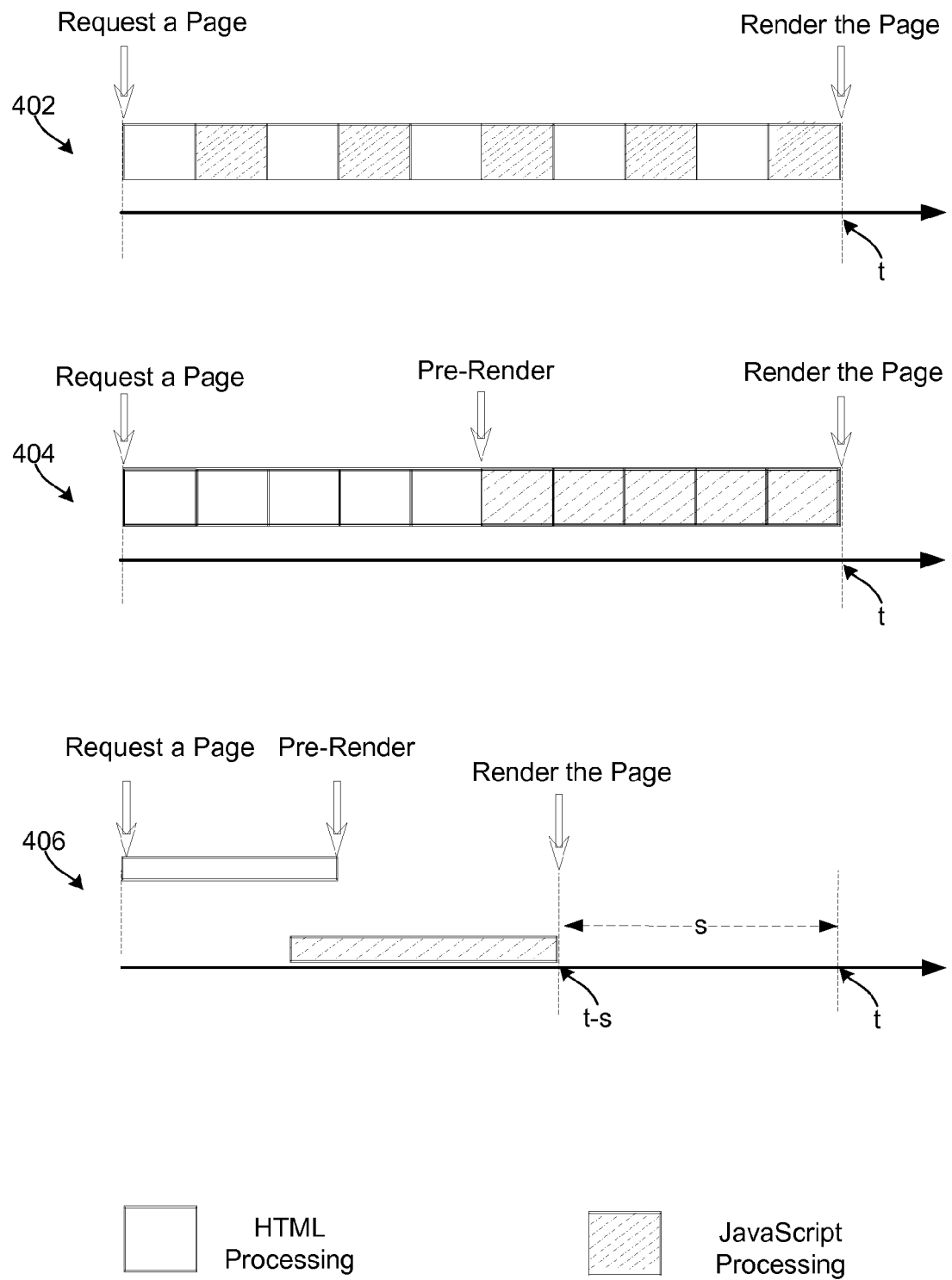
FIG. 4 is a timing diagram that illustrates the processing times associated with each of the methods illustrated in FIGS. 1-3.

As illustrated in FIG. 4, reordering the JAVASCRIPT® process to execute after the HTML process (illustrated by element 404 and discussed above with reference to FIG. 2) requires the same amount of time (t) to render a requested page as does alternating between the HTML and JAVASCRIPT® processes (illustrated by element 402 and discussed above with reference to FIG. 1). However, FIG. 4 illustrates that breaking up the HTML and JAVASCRIPT® processing into multiple processes and allowing the individual processes to execute concurrently (as illustrated by element 406) allows the page to be rendered at a much earlier time (e.g., at t-s seconds instead of at t seconds) than methods requiring serial execution. Thus, a significant amount of time (i.e., s seconds) may be saved by executing the HTML and JAVASCRIPT® processes concurrently.

To achieve concurrent execution, the dependence of the HTML parser on the JAVASCRIPT® engine may be broken, and the state of the HTML parser may be managed such that the HTML code generated by the JAVASCRIPT® engine does not negatively impact the HTML parser. Additionally, to achieve concurrent execution, mechanisms for speculation and rollback may be provided to allow the HTML parser to speculatively parse the remaining portions of the HTML code while the JAVASCRIPT® engine executes, and upon encountering errors, rollback the execution to a previously saved state that will result in HTML parsing without errors.

The various aspects break the dependence of the HTML parser on the JAVASCRIPT® engine, providing mechanisms for saving and managing the operational states of the HTML parser and the JAVASCRIPT® engine, which permit the HTML parser to speculatively parse the HTML while JAVASCRIPT® is executed without generating errors. This enables concurrent execution of the HTML parser and the JAVASCRIPT® execution engine. In the various aspects the JAVASCRIPT® execution engine may determine whether results of execution of a particular JAVASCRIPT® invalidated a portion of the speculative HTML parse (i.e., the HTML parse that proceeded after a script tag was encountered). If the JAVASCRIPT® execution does not invalidate the speculative HTML parse, the results of the speculative parse and DOM tree may be committed to memory. If the JAVASCRIPT® execution engine determines that the executed JAVASCRIPT® may have invalidated a portion of the speculative HTML parse, a portion of the HTML parse is discarded and the HTML parsing is rolled back to an appropriate location and the code reparsed. This ensures that any HTML code inserted by executed JAVASCRIPT® will be properly parsed.

Figure 5:
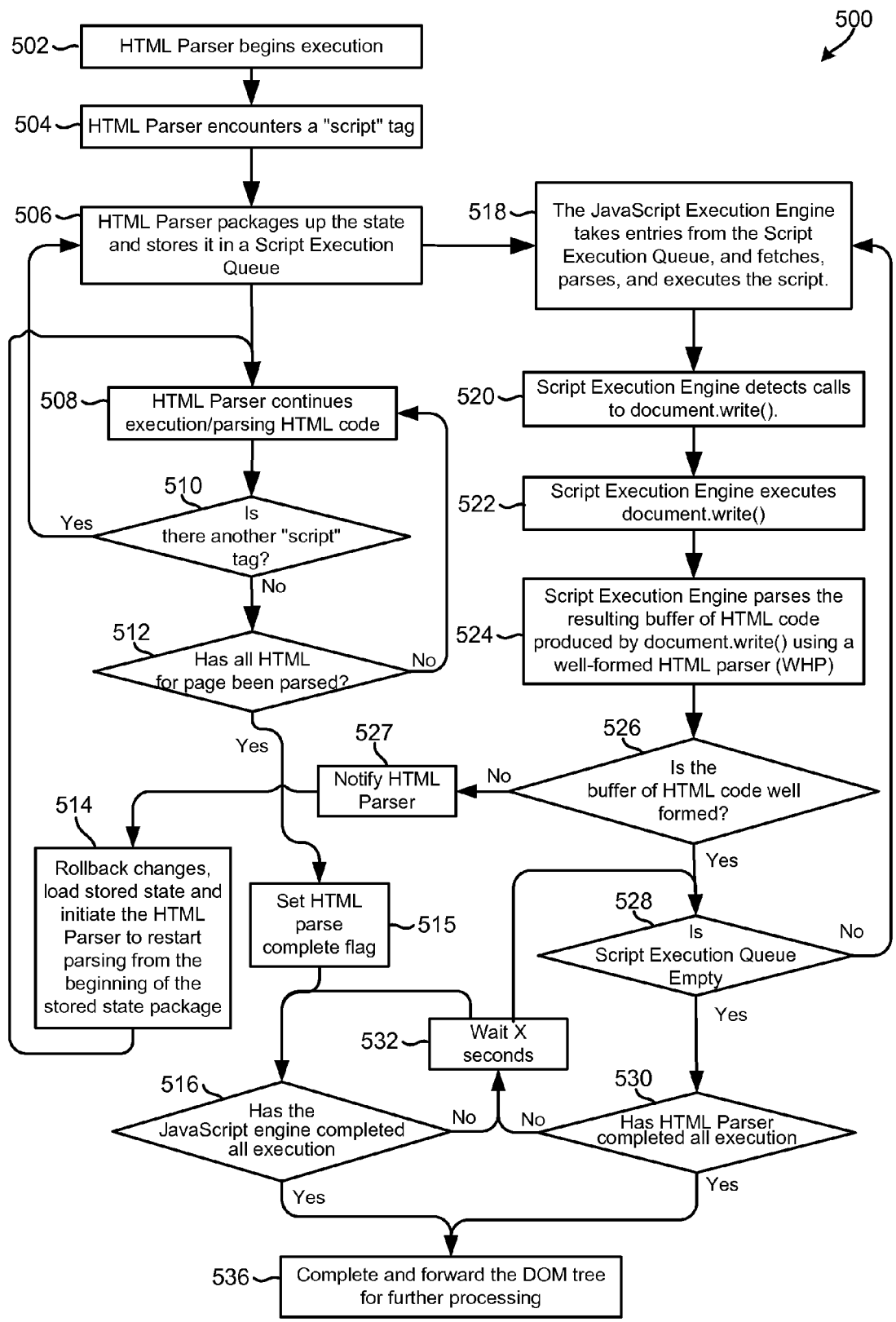
FIG. 5 is a process flow diagram that illustrates an aspect method for controlling the interaction between HTML processing and JAVASCRIPT® processing during a page load operation.

FIG. 5 illustrates an aspect method 500 for controlling the interaction between HTML processing and JAVASCRIPT® processing during a page load operation so that the HTML processes can run concurrently with the JAVASCRIPT® processes. In method 500 at block 502, the HTML parser may begin parsing the HTML code associated with a requested web page. If, during the process of parsing the HTML code, the HTML parser encounters a "script" tag in block 504, the HTML parser may package up the state of execution into an execution state package that is stored in a JAVASCRIPT® execution queue in block 506. This operation may involve extracting the segment of scripting language code contained in the identified portion of the markup language code, storing a memory location associated with the extracted portion of the scripting language code, and storing an execution context associated with the extracted portion of the scripting language code. Thus, the state of execution may include the script's execution context and the location of the script body, as well as other information identifying segments of code associated with the script tag. In various aspects, the packaging of the state of execution may involve the use of a pointer array. In these aspects, each pointer in the pointer array (used to package the state of execution) may point to a location in memory associated with a segment of code containing the encountered script tag. Thus, in various aspects, the execution state package may include scripting language code, parsing state information, execution contexts, memory locations, and identifiers of locations or points of interest in the markup language code, as well as other elements relevant to capturing, storing, and retrieving the state of execution at the time the script tag was encountered by the HTML parser.

In various aspects, the JAVASCRIPT® execution engine may monitor the JAVASCRIPT® execution queue for actions, state changes, status updates, and/or to determine if the execution queue contains elements available for processing resulting from the execution of block 506. If the JAVASCRIPT® execution engine determines that the JAVASCRIPT® execution queue contains elements available for processing, the JAVASCRIPT® execution engine may extract the saved state information from the queue, and begin fetching, parsing, and executing the script in block 518. In various aspects, any action, state change or status updates to the JAVASCRIPT® execution queue may trigger the JAVASCRIPT® execution engine to determine that the JAVASCRIPT® execution queue contains elements available for processing. In an aspect, only a predefined category of actions, state changes or status updates will trigger the JAVASCRIPT® execution engine. In any case, when the JAVASCRIPT® execution engine determines, or is otherwise informed, that there are elements available for processing, the saved state information may be extracted from the queue for the fetching, parsing, and execution operations. Operations in block 518 may further include evaluating extracted scripting language code to identify specific characteristics that allow the scripting language execution process to insert the generated second unit of markup language code into the received markup language code associated with the requested web page.

Meanwhile, the HTML parser may continue parsing the remaining portions of the HTML code in block 508, while the JAVASCRIPT® engine executes the script in block 518. In parsing the remaining portions of the HTML code, the HTML parser may continually evaluate the HTML code being parsed for additional script tags in determination step 510. Each time the HTML parser encounters a script tag (i.e., determination block 510="Yes"), the HTML parser may return to block 506 to repeat the processes of storing the state and adding the script to the JAVASCRIPT® execution queue. At determination block 512 the HTML parser may determine whether there is more HTLM code to parse, and if so, return to block 508 to continue parsing.

While the HTML parser continues parsing and evaluates the HTML code, the JAVASCRIPT® engine may continue to pull and execute scripts from the JAVASCRIPT® execution queue in block 518. As the JAVASCRIPT® engine parses, processes, and runs each script, the JAVASCRIPT® engine may evaluate the script text for specific characteristics that allow the JAVASCRIPT® engine to write HTML text directly into the main HTML document in block. When the JAVASCRIPT® execution engine encounters a document.write( ) function, for example, in block 520, the JAVASCRIPT® engine may execute the document.write( ) function to generate and insert HTML code directly into the main HTML document in block 522. It should be noted that the document.write( ) function is a predefined function in JAVASCRIPT® that allows HTML text to be outputted into the document containing the script, and is used here for illustrative purposes only. Nothing in this application should be understood as limiting the scope to the document.write( ) function, unless expressly recited in the claims.

When executing a write function to generate and insert HTML code directly into the main HTML document in block 522, the JAVASCRIPT® execution engine may use the saved state information to insert the generated HTML code. This insertion of generated HTML code may modify the DOM tree used by the HTML processes, which may create new nodes for the DOM tree, and annex the new nodes to the main DOM tree.

After executing the write function in block 522, the JAVASCRIPT® engine may parse the resulting buffer of HTML code produced by executing a write function call, for example, by using a well formed HTML parser (WHP) in block 524. In determination block 526, the JAVASCRIPT® engine may determine if the document is well formed. As previously mentioned, in various aspects, a document may be determined to be "well formed" if all of the script open tags (e.g., '<') have a corresponding script close tag (e.g., '>'). In the various aspects, if the buffer of HTML code is determined to be not well formed (i.e., determination block 526="No"), the JAVASCRIPT® execution engine may notify the HTML parser that an error has been encountered in block 527. The JAVASCRIPT® execution engine may notify the HTML parser by setting an "error" flag and/or bit in block 527.

Upon receiving a notification that generated HTML was not well formed in block 527, in block 514 the HTML parser may load, from the JAVASCRIPT® execution queue, stored state information corresponding to a prior state of execution that will be free of any errors when reparsed. The state information used in this roll back operation will be that saved in block 506 for the script tag that resulted in the not well formed HTML document. For example, the roll back may proceed to a state of execution immediately preceding the script tag for the JAVASCRIPT® that resulted in the encountered problem. The HTML parser may use this loaded state information to roll back changes made by the JAVASCRIPT® execution engine, and to restart parsing the HTML code from the beginning of the loaded state package by returning to block 506. In block 514 the HTML parser may discard any processing done after the state in which the error was encountered, and in block 506 restart processing of portions of the HTML code associated with and/or affected by the generated HTML code. This roll back ensures that any HTML code inserted by the executed JAVASCRIPT® will be properly parsed by the HTML parser. While this discards some of the parsed HTML, this roll back only occurs when the JAVASCRIPT® is not well formed, and thus should not greatly diminish the execution time savings enabled by concurrent execution of HTML and JAVASCRIPT® processes.

If it is determined that the buffer of HTML code is well formed (i.e., determination block 526="Yes"), in determination block 528 the JAVASCRIPT® execution engine may check the JAVASCRIPT® execution queue to determine if there are other tasks ready for execution (i.e., the JAVASCRIPT® queue is not empty). If there are JAVASCRIPT® tasks remaining to be processed (i.e., determination block 528="No"), the JAVASCRIPT® engine may return to block 518 to pull and execute each of the remaining scripts from the JAVASCRIPT® execution queue. If there are no remaining JAVASCRIPT® tasks in the queue (i.e., determination block 528="Yes"), in determination block 530 the JAVASCRIPT® execution engine may check to see if the HTML parser has completed execution (i.e., the HTML parser has parsed all the remaining HTML code).

If the JAVASCRIPT® execution engine determines that the HTML parser has not finished parsing the HTML code (i.e., determination block 530="No"), the JAVASCRIPT® execution engine may pause or suspend execution for a predetermined amount of time in block 532, before repeating determination block 528 to check whether the JAVASCRIPT® execution queue holds any new tasks ready for processing.

If there are no new tasks ready for execution (i.e., determination block 528="Yes") and the JAVASCRIPT® execution engine determines that the HTML parser has completed execution (i.e., determination block 530="Yes"), the JAVASCRIPT® engine may write out to and/or modify the DOM tree, and forward the DOM tree to the browser for further processing in block 536.

As discussed above, the various aspects exemplified in method 500 allow the HTML parser to post additional scripts to the JAVASCRIPT® execution queue as they are encountered in the speculative parse occurring in blocks 506 to 512, i.e., while the JAVASCRIPT® execution engine executes scripts posted to the queue. To enable the JAVASCRIPT® engine to execute scripts in block 518 to 528 while the HTML parser speculatively parses the remaining HTML code, the scripts may be posted to and removed from the JAVASCRIPT® execution queue in first in/first out manner. In other words, the HTML parser may store each execution state package in a rear terminal position of the JAVASCRIPT® execution queue, and the JAVASCRIPT® execution engine may retrieve each execution state package from a front terminal of the JAVASCRIPT® execution queue.

The concurrent JAVASCRIPT® and HTML processes may continue until all the script tags have been processed and all HTML code has been parsed. Once the HTML parser has finished parsing all the HTML code (i.e., determination block 512="Yes"), the HTML parser may notify the JAVASCRIPT® execution engine that it has finished parsing the entire HTML document in block 515. In block 515, the HTML parser may notify the JAVASCRIPT® execution engine by setting a "parse complete" flag readable by the JAVASCRIPT® engine.

Upon completing all HTML parsing (i.e., determination block 512="Yes"), the HTML parser may check to see if the JAVASCRIPT® engine has finished executing in determination block 516. If the JAVASCRIPT® engine is still executing (i.e., determination block 516="No"), the HTML parser may pause for a predetermined amount of time in block 532. After waiting the predetermined amount of time, the HTML parser may return to determination block 516 to check whether the JAVASCRIPT® engine is still executing. Alternatively, the process may proceed to determination block 528 to determine whether the JAVASCRIPT® execution queue is empty.

This process of waiting for the JAVASCRIPT® engine to finish executing if it has not already finished when HTML parsing is finished may continue until the JAVASCRIPT® engine completes its execution (i.e., determination block 530=Yes) or until the HTML parser receives a notification from the JAVASCRIPT® execution engine that an error has been encountered (i.e., determination block 526="No"). If the HTML parser receives notification that the JAVASCRIPT® engine has completed its execution (i.e., determination block 530="Yes"), then the HTML parser may write out to and/or modify the DOM tree, and forward the DOM tree to the browser for further processing in block 536.

Note that so long as the JAVASCRIPT® engine is executing scripts it may encounter a non-well formed document (i.e., determination block 526="No"), in which case the HTML parser will be informed in block 527, and the processes of rolling back to a prior state and discarding parsed HTML work in block 514 will be performed and execution will return to block 508 as described above. In this case the HTML parsing will no longer be complete. So, if this occurs while the HTML parser is waiting for script execution to complete, the HTML parser may notify the JAVASCRIPT® engine that its execution is no longer "complete." In various aspects this may be accomplished by the HTML parser sending the JAVASCRIPT® engine a "busy" notification, or resetting the "parse complete" flag. The HTML parser then begins reparsing the HTML from roll back state as described above.

Figure 6:
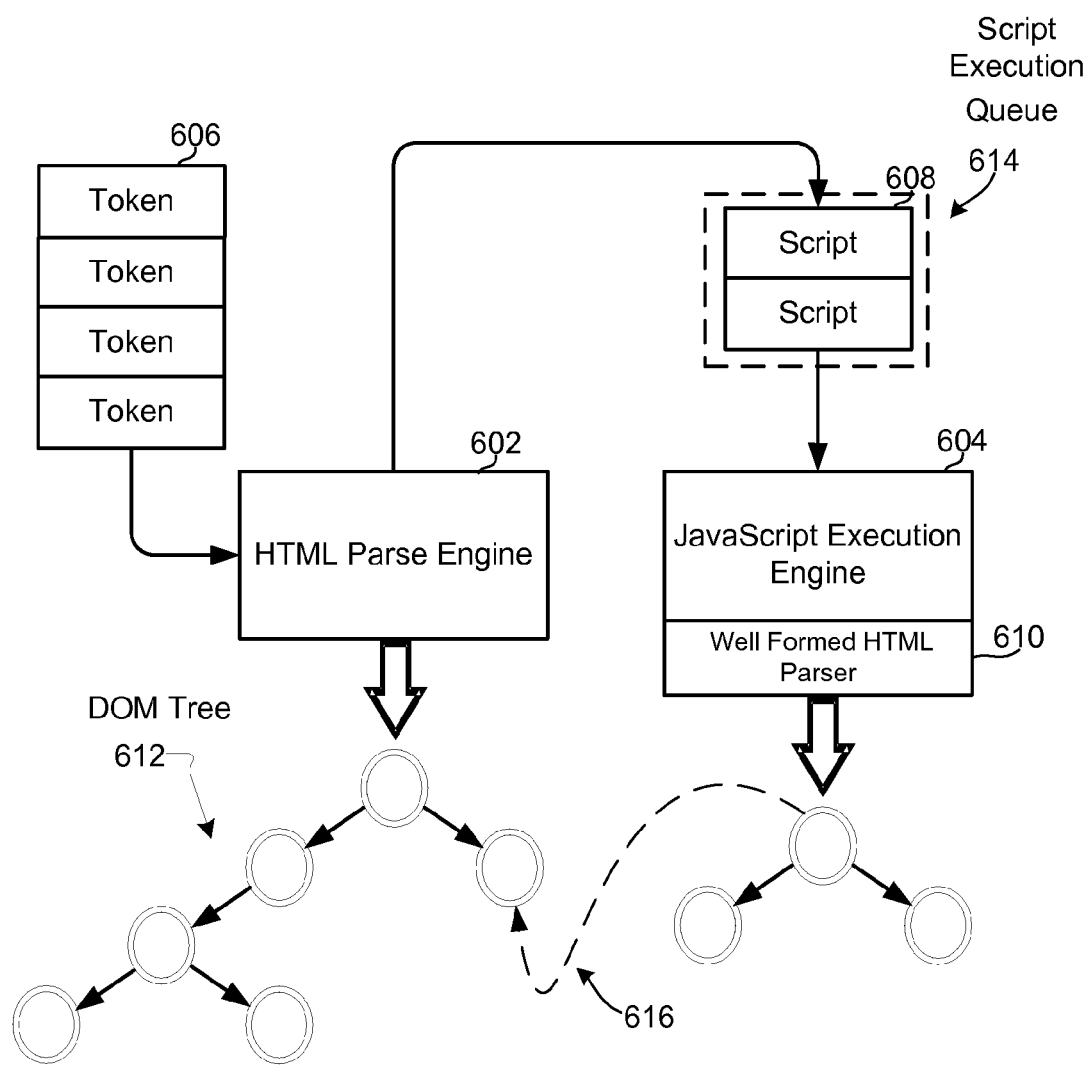
FIG. 6 is a process block diagram of functional components suitable for use with the various aspects.

FIG. 6 illustrates exemplary functional modules that may be used for implementing the various aspects. Such functional modules may include an HTML parser engine 602, a JAVASCRIPT® execution engine 604, a well-formed HTML parser (WHP) 610, and a DOM tree storage module 612. The HTML parser engine 602 may receive as input string tokens 606 of HTML code, and parse the tokens 606 for annotations and substantive text as part of the overall HTML processing. If during the processing of the string tokens 606 the HTML parser engine 602 encounters JAVASCRIPT® tags, the HTML parser engine 602 may extract the portions of the token 606 associated with the encountered JAVASCRIPT® tag to generate one or more scripts 608 for execution by the JAVASCRIPT® execution engine 604. The scripts 608 may then be stored in a memory, such as a script execution queue 614. The script execution queue 614 may be monitored by the JAVASCRIPT® execution engine 604 so that when the queue 614 contains scripts 608, the JAVASCRIPT® execution engine 604 pulls the next available script 608 out of the script execution queue 614 for parsing, processing, and/or execution.

If during the process of execution the JAVASCRIPT® execution engine 604 encounters a write function (e.g., a document.write( ) call), the JAVASCRIPT® execution engine 604 may execute the write function to generate and insert HTML code directly into the document being processed by the HTML parser engine 602. After executing the write function, WHP parser 610 may parse a resulting buffer of HTML code produced by the JAVASCRIPT® execution engine 604 executing the write function. In various aspects, the WHP parser 610 may be a XHTML parser. If the WHP parser 610 determines that the HTML code is not well formed, the parser 610 may notify the JAVASCRIPT® execution engine 604, which in turn notifies the HTML parser 610 that an error has been encountered. Upon receiving this notification, the HTML parser 610 may load a stored state package (stored in block 506 as described above) corresponding to a state prior to execution of the script in which the problem was encountered, implement the changes in the HTML code made by the Java execution engine 604, and restart parsing of the HTML code from the beginning of the loaded state package. If, on the other hand, he WHP parser 610 determines that the HTML code is well formed, the WHP parser 610 may notify the JAVASCRIPT® execution engine 604, and the HTML may be removed from the buffer and annexed to the DOM tree 612 being modified by the HTML parser engine 602 as illustrated by arrow 616.

The various aspects may be implemented by modifying existing HTML parsers and JAVASCRIPT® execution engines to incorporate one or more of four general modifications. In various aspects, the HTML parser may be modified to package up the context information (including state information) and post it in a JAVASCRIPT® queue. In various aspects, JAVASCRIPT® engine may be modified to pull scripts from the JAVASCRIPT® queue, and, after execution of each script, run a special checker which determines whether the generated HTML has or would cause a well formed violation and set a flag and/or send a notification to the HTML parser when a well formed violation is determined. In various aspects, the HTML parser may be modified to check this well formed violation flag and/or receive the notification of the violation, and perform a roll back and re-parse the HTML code from the state stored by the HTML parser when the script was posted to the JAVASCRIPT® execution queue. In various aspects, both the HTML parser and the JAVAS-CRIPT® engine may be modified to include a checker that allows each processing engine to determine whether the other processing engine has completed execution of the document.

The various aspects are preferably implemented on a single processor and involve the concurrent execution of a single HTML process and a single JAVASCRIPT® process. However, it is contemplated that the various aspects may be implemented on any number of multi-task, multi-core, and/or multiprocessor systems. Thus, nothing in this application should limit the aspects disclosed herein to a single HTML process and a single JAVASCRIPT® process unless recited by the claims.

Figure 7:
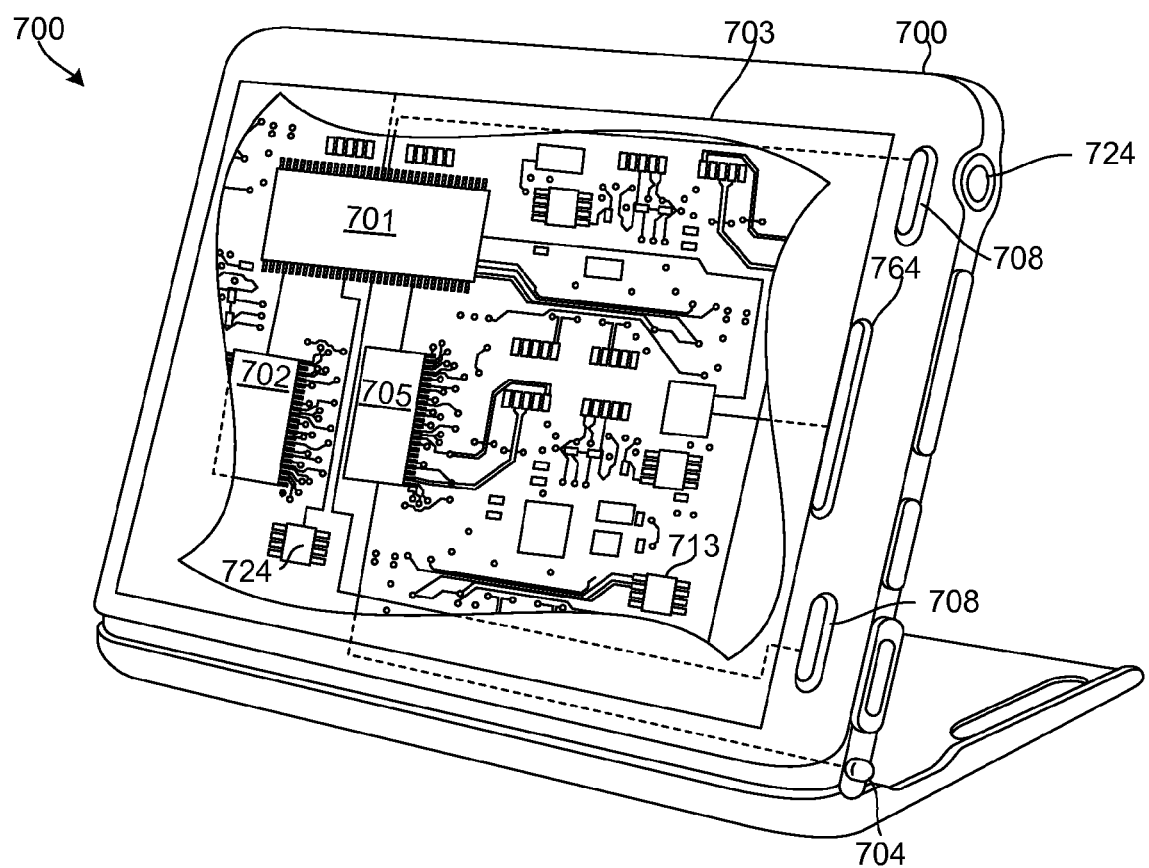
FIG. 7 is a cutaway perspective view of a mobile computing device suitable for use with the various aspects.

FIG. 7 is a system block diagram of a receiver device suitable for use with any of the aspects. A typical receiver device 700 may include a processor 701 coupled to internal memory 702, a display 703, and to a speaker 710. Additionally, the receiver device 700 may include an antenna 704 for sending and receiving electromagnetic radiation that may be connected to a wireless data link and/or cellular telephone transceiver 705 coupled to the processor 701 and a mobile multimedia broadcast receiver 706 coupled to the processor 701. Receiver devices 700 typically also include menu selection buttons or rocker switches 708 for receiving user inputs.

The various aspect methods for currently executing HTML processes and JAVASCRIPT® processes and/or rendering the resulting webpage may be performed by portions of the processor 701, memory 702, and display 703. Alternatively dedicated modules within or coupled to the receiver 700 may perform the aspect methods.

Figure 8:
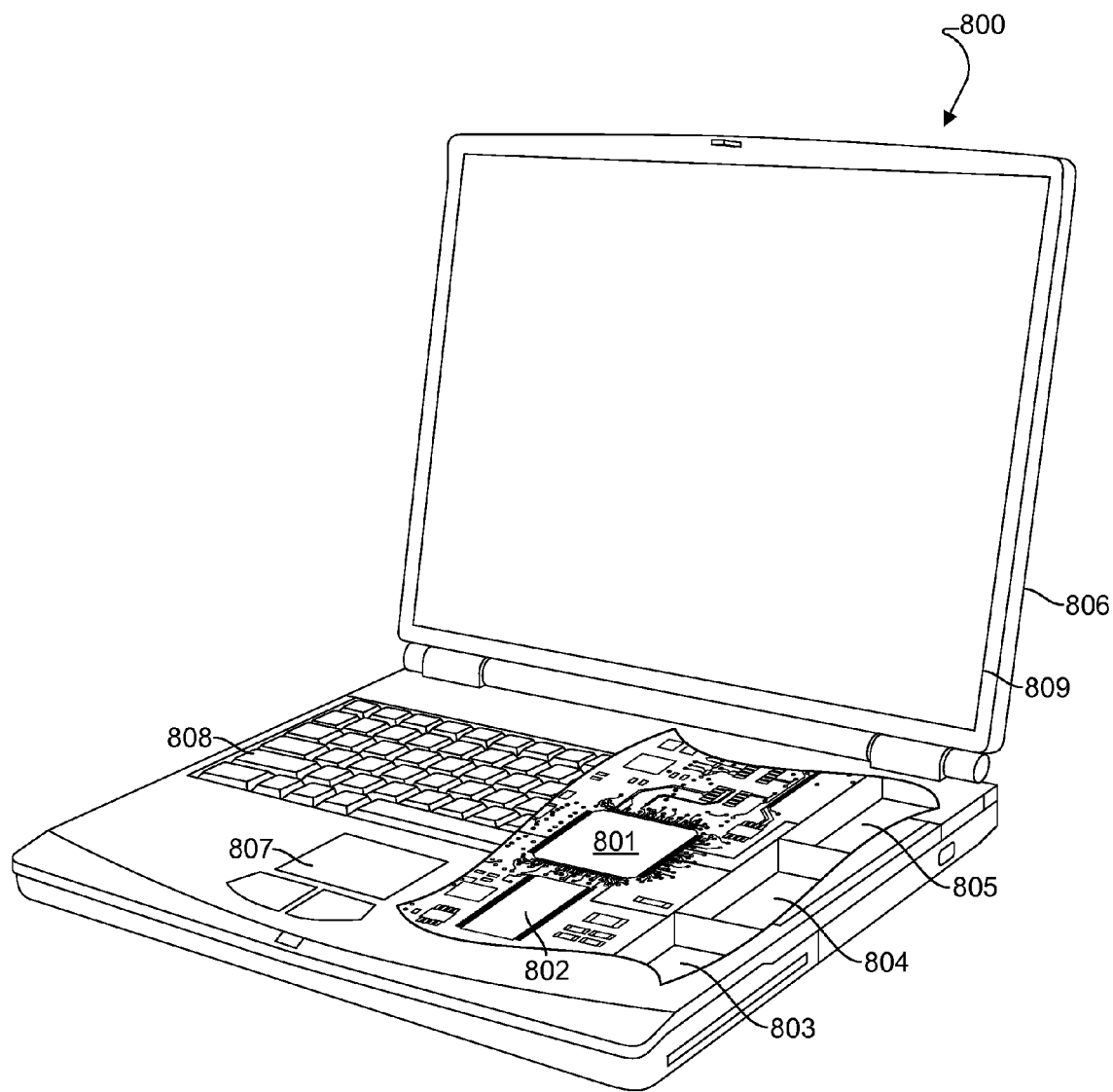
FIG. 8 is an illustration of an example computer suitable for use with the various aspects.

The aspects described above may also be implemented within a variety of computing devices, such as a laptop computer 800 as illustrated in FIG. 8. Many laptop computers include a touch pad touch surface that serves as the computer's pointing device, and thus may receive drag, scroll, and flick gestures similar to those implemented on mobile computing devices equipped with a touch screen display. A laptop computer 800 will typically include a processor 801 coupled to volatile memory 802 and a large capacity nonvolatile memory, such as a disk drive 803. The computer 800 may also include a floppy disc drive 804 and a compact disc (CD) drive 805 coupled to the processor 801. The computer device 800 may also include a number of connector ports coupled to the processor 801 for establishing data connections or receiving external memory devices, such as a USB or FIREWIRE® connector sockets, or other network connection circuits 806 for coupling the processor 801 to a network. In a notebook configuration, the computer housing includes the touchpad 807, keyboard 808, and the display 809 all coupled to the processor 801. Other configurations of computing device may include a computer mouse or trackball coupled to the processor (e.g., via a USB input) as are well known.

The processors 701, 801 may be any programmable microprocessor, microcomputer or multiple processor chip or chips that can be configured by software instructions (applications) to perform a variety of functions, including the functions of the various aspects described below. In some mobile receiver devices, multiple processors 701 may be provided, such as one processor dedicated to wireless communication functions and one processor dedicated to running other applications. Typically, software applications may be stored in the internal memory 702, 802, 803 before they are accessed and loaded into the processor 701, 801. The processor 701, 801 may include internal memory sufficient to store the application software instructions.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), a DSP within a multimedia broadcast receiver chip, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for executing a first serial language code in a processor, comprising:
    parsing a first serial language code having an embedded second serial language code until a segment of the second serial language code is encountered, the second serial language code being executable to generate additional first serial language code;
    storing parsing state information associated with the parsing of the first serial language code upon encountering the segment of the second serial language code in a memory of a computing device;
    continuing to parse the first serial language code;
    executing the encountered segment of the second serial language code to generate the additional first serial language code, wherein the encountered segment of the second serial language code is executed concurrent with the continued parsing of the first serial language code;
    inserting the additional first serial language code at a point in the first serial language code identified by the stored parsing state information;
    determining whether the additional first serial language code generated from the execution of the encountered segment of the second serial language code is well formed; and
    re-initiating parsing of the first serial language code and the additional first serial language code from the point in the first serial language code identified by the stored parsing state information in response to determining that the additional first serial language code is not well formed.

2. The method of claim 1, further comprising:
    packaging the second serial language code and the parsing state information in an execution state package upon encountering the segment of second serial language code; and
    storing the execution state package in a memory of a computing device.

3. The method of claim 2, further comprising:
    retrieving the parsing state information stored with the execution state package when it is determined that the generated first serial language code is not well formed; and
    discarding parse data generated from parsing the first serial language code after a point in the first serial language code identified by the execution state package.

4. The method of claim 2, wherein packaging the second serial language code and the parsing state information in an execution state package upon encountering the segment of second serial language code comprises:
    extracting the segment of second serial language code contained in the identified portion of the first serial language code;

storing a memory location associated with the extracted segment of the second serial language code;

storing an execution context associated with the extracted segment of the second serial language code; and bundling the stored memory location and the stored execution context with the extracted segment of the second serial language code in the execution state package prior to storing the execution state package in the memory of the computing device.

5. The method of claim 1, wherein parsing the first serial language code comprises parsing markup language code.

6. The method of claim 5, wherein parsing markup language code comprises parsing hyper text markup language (HTML) code.

7. The method of claim 1, wherein executing the encountered segment of the second serial language code comprises executing scripting language code.

8. A computing device, comprising:
a processor configured with processor-executable instructions to perform operations comprising:
parsing a first serial language code having an embedded second serial language code until a segment of the second serial language code is encountered, the second serial language code being executable to generate additional first serial language code;
storing parsing state information associated with the parsing of the first serial language code upon encountering the segment of the second serial language code in a memory of the computing device;
continuing to parse the first serial language code;
executing the encountered segment of the second serial language code to generate the additional first serial language code, wherein the encountered segment of the second serial language code is executed concurrent with the continued parsing of the first serial language code;
inserting the additional first serial language code at a point in the first serial language code identified by the stored parsing state information;
determining whether the additional first serial language code generated from the execution of the encountered segment of the second serial language code is well formed; and
re-initiating parsing of the first serial language code and the additional first serial language code from the point in the first serial language code identified by the stored parsing state information in response to determining that the additional first serial language code is not well formed.

9. The computing device of claim 8, wherein the processor is configured with processor-executable instructions to perform operations further comprising:
packaging the second serial language code and parsing state information in an execution state package upon encountering the segment of second serial language code; and
storing the execution state package in the memory of the computing device.

10. The computing device of claim 9, wherein the processor is configured with processor-executable instructions to perform operations further comprising:
retrieving the parsing state information stored with the execution state package when it is determined that the generated first serial language code is not well formed; and discarding parse data generated from parsing the first serial language code after a point in the first serial language code identified by the execution state package.

11. The computing device of claim 9, wherein the processor is configured with processor-executable instructions to perform operations such that packaging the second serial language code and the parsing state information in an execution state package upon encountering the segment of second serial language code comprises:
extracting the segment of second serial language code contained in the identified portion of the first serial language code;
storing a memory location associated with the extracted segment of the second serial language code in the memory;
storing an execution context associated with the extracted segment of the second serial language code in the memory; and
bundling the stored memory location and the stored execution context with the extracted segment of the second serial language code in the execution state package prior to storing the execution state package in the memory of the computing device.

12. The computing device of claim 8, wherein the processor is configured with processor-executable instructions to perform operations such that parsing the first serial language code comprises parsing markup language code.

13. The computing device of claim 12, wherein the processor is configured with processor-executable instructions to perform operations such that parsing markup language code comprises parsing hyper text markup language (HTML) code.

14. The computing device of claim 8, wherein the processor is configured with processor-executable instructions to perform operations such that executing the encountered segment of the second serial language code comprises executing scripting language code.

15. A non-transitory storage medium having stored thereon processor-executable software instructions configured to cause a processor to perform operations comprising:
parsing a first serial language code having an embedded second serial language code until a segment of the second serial language code is encountered, the second serial language code being executable to generate additional first serial language code;
storing parsing state information associated with the parsing of the first serial language code upon encountering the segment of the second serial language code in a memory;
continuing to parse the first serial language code;
executing the encountered segment of the second serial language code to generate the additional first serial language code, wherein the encountered segment of the second serial language code is executed concurrent with the continued parsing of the first serial language code;
inserting the additional first serial language code at a point in the first serial language code identified by the stored parsing state information;
determining whether the additional first serial language code generated from the execution of the encountered segment of the second serial language code is well formed; and
re-initiating parsing of the first serial language code and the additional first serial language code from the point in the first serial language code identified by the stored parsing state information in response to determining that the additional first serial language code is not well formed.

16. The non-transitory storage medium of claim 15, wherein the stored processor-executable software instructions are configured to cause a processor to perform operations further comprising:
packaging the second serial language code and parsing state information in an execution state package upon encountering the segment of second serial language code; and
storing the execution state package in the memory.

17. The non-transitory storage medium of claim 16, wherein the stored processor-executable software instructions are configured to cause a processor to perform operations further comprising:
retrieving the parsing state information stored with the execution state package when it is determined that the generated first serial language code is not well formed; and
discarding parse data generated from parsing the first serial language code after a point in the first serial language code identified by the execution state package.

18. The non-transitory storage medium of claim 16, wherein the stored processor-executable software instructions are configured to cause a processor to perform operations such that packaging the second serial language code and the parsing state information in an execution state package upon encountering the segment of second serial language code comprises:
extracting the segment of second serial language code contained in the identified portion of the first serial language code;
storing a memory location associated with the extracted segment of the second serial language code;
storing an execution context associated with the extracted segment of the second serial language code; and
bundling the stored memory location and the stored execution context with the extracted segment of the second serial language code in the execution state package prior to storing the execution state package in the memory.

19. The non-transitory storage medium of claim 15, wherein the stored processor-executable software instructions are configured to cause a processor to perform operations such that parsing the first serial language code comprises parsing markup language code.

20. The non-transitory storage medium of claim 19, wherein the stored processor-executable software instructions are configured to cause a processor to perform operations such that parsing markup language code comprises parsing hyper text markup language (HTML) code.

21. The non-transitory storage medium of claim 15, wherein the stored processor-executable software instructions are configured to cause a processor to perform operations such that executing the encountered segment of the second serial language code comprises executing scripting language code.

* * * * *